US011241975B2

(12) United States Patent
Patel (10) Patent No.: US 11,241,975 B2
(45) Date of Patent: Feb. 8, 2022

(54) ELECTRIC VEHICLE HOME MICROGRID POWER SYSTEM

(71) Applicant: Himanshu B. Patel, Cherry Hill, NJ (US)

(72) Inventor: Himanshu B. Patel, Cherry Hill, NJ (US)

( * ) Notice: Subject to any disclaimer, the term of this patent is extended or adjusted under 35 U.S.C. 154(b) by 0 days.

(21) Appl. No.: 17/354,704

(22) Filed: Jun. 22, 2021

(65) Prior Publication Data

US 2022/0009373 A1   Jan. 13, 2022

Related U.S. Application Data

(60) Provisional application No. 63/102,843, filed on Jul. 7, 2020.

(51) Int. Cl.
| | |
|---|---|
| *B60L 53/60* | (2019.01) |
| *B60L 53/65* | (2019.01) |
| *B60L 55/00* | (2019.01) |
| *B60L 58/12* | (2019.01) |
| *B60L 53/64* | (2019.01) |
| *B60L 53/12* | (2019.01) |
| *B60L 53/20* | (2019.01) |
| *B60L 58/16* | (2019.01) |
| *B60L 58/24* | (2019.01) |
| *H02J 3/00* | (2006.01) |
| *H02J 7/00* | (2006.01) |
| *H02J 3/32* | (2006.01) |
| *B60L 53/62* | (2019.01) |

(52) U.S. Cl.
CPC ............... *B60L 55/00* (2019.02); *B60L 53/12* (2019.02); *B60L 53/20* (2019.02); *B60L 53/62* (2019.02); *B60L 53/64* (2019.02); *B60L 58/12* (2019.02); *B60L 58/16* (2019.02); *B60L 58/24* (2019.02); *H02J 3/003* (2020.01); *H02J 3/322* (2020.01); *H02J 7/0029* (2013.01); *H02J 7/0047* (2013.01); *B60L 2210/40* (2013.01); *H02J 2310/48* (2020.01)

(58) Field of Classification Search
None
See application file for complete search history.

(56) References Cited

U.S. PATENT DOCUMENTS

| | | | |
|---|---|---|---|
| 8,810,192 B2 | 8/2014 | Bridges et al. | |
| 8,872,379 B2 * | 10/2014 | Ruiz | B60L 53/51 307/66 |
| 9,559,521 B1 | 1/2017 | King | |

(Continued)

FOREIGN PATENT DOCUMENTS

WO   WO 2019/046939   3/2019

OTHER PUBLICATIONS

ISA/US; International Search Report prepared for PCT/US2021/038489; dated Sep. 15, 2021.

*Primary Examiner* — Jared Fureman
*Assistant Examiner* — Aqeel H Bukhari
(74) *Attorney, Agent, or Firm* — Kirk A. Wilson; Joseph T. Guy; Patent Filing Specialist Inc.

(57) ABSTRACT

An efficient system and method for usage, storage, and sharing of electrical energy with buildings, vehicles, and power grid distribution equipment. More specifically, a microgrid power system and method of use that interconnects an electric vehicle with a home grid-based power system for optimized energy management of the combined power sources.

20 Claims, 7 Drawing Sheets

(56) References Cited

U.S. PATENT DOCUMENTS

| | | |
|---|---|---|
| 9,817,423 B2 | 11/2017 | King |
| 9,845,921 B2 | 12/2017 | Yang et al. |
| 10,279,698 B2 | 5/2019 | Bridges et al. |
| 2007/0043478 A1 | 2/2007 | Ehlers et al. |
| 2008/0040263 A1 | 2/2008 | Pollack et al. |
| 2009/0192655 A1 | 7/2009 | Ichikawa et al. |
| 2010/0017045 A1 | 1/2010 | Nesler et al. |
| 2012/0086397 A1 | 4/2012 | Obayashi et al. |
| 2014/0257583 A1 | 9/2014 | Wada et al. |
| 2014/0354228 A1* | 12/2014 | Williams ............... B60L 53/64 320/109 |
| 2015/0280432 A1 | 10/2015 | Lam |
| 2020/0031238 A1* | 1/2020 | Kydd ..................... H02J 3/383 |
| 2020/0070672 A1 | 3/2020 | Vahedi et al. |

\* cited by examiner

ELECTRIC VEHICLE HOME MICROGRID POWER SYSTEM

CROSS-REFERENCE TO RELATED APPLICATIONS

The present invention claims priority to U.S. Provisional Patent Application No. 63/102,843, filed Jul. 7, 2020, which is incorporated herein by reference in its entirety.

FIELD OF THE INVENTION

The present invention is related to efficient usage, storage, and sharing of electrical energy with buildings, vehicles, and power grid distribution equipment. More specifically, the invention relates to a microgrid power system that interconnects an electric vehicle with a home grid-based power system for optimized energy management of the combined power sources.

BACKGROUND

Today, homes are powered in a few different methods. One method is directly from the utilities which brings power from generating plants which provide non-renewable energy, converted to electricity and sent through power lines that are run from said overhead lines to your home. Other ways homes are powered are by using standby permanently mounted generator which utilizes non-renewable energy such as gas or propane. Homes are also powered by permanently mounted solar panels which are also permanently mounted and require large battery storage locations and difficult to maintain. These methods can be made more efficiently and add other advantages.

Energy drives a myriad of devices and equipment in commercial, industrial, and residential applications. For example, energy drives lights, motors, household appliances, medical equipment, computers, heating and air conditioning systems, and many other electrical devices. Some of these devices require continuous power to function, e.g., medical monitoring equipment. Unfortunately, the existing infrastructure relies heavily on fossil fuels to power combustion engines in vehicles and equipment, and power utilities to generate and distribute electricity through a power grid to the various applications.

Shortages and/or increased costs associated with fossil fuels and electricity from power utilities significantly impact consumers and businesses. In general, shortages and/or increased costs often occur during times of peak demand. On a daily basis, peak demand occurs during the daytime, while minimum demand occurs during the night time. On a more random basis, peak demand (or a demand greater than an available supply) may occur as a result of a natural disaster. For example, a hurricane or earthquake may damage the power grid and/or electric generators of the power utilities, thereby resulting in substantial loss of electric power to commercial, industrial, and residential applications. Repairs to these damaged lines and generators may take hours, days, or weeks. Various sites also may lose power from the power grid for other reasons. During these times of lost power, the sites may be unable to continue operations.

Many existing vehicle-to-home systems operate in isolated mode where EVs will not operate as back-up power supply. Other existing systems do not sense peak load demand, to supply energy which results in reduced electricity pricing. Additional drawback of the existing systems are the EV battery charger controller, serving as efficient supply to the customer load, is not optimal.

Often, energy is more expensive during times of peak demand. For example, a power utility may employ low cost electrical generators during periods of minimum demand, while further employing high cost electrical generators during periods of peak demand. Unfortunately, the existing infrastructure does not adequately address these different costs associated with peak and minimum demands. As a result, commercial, industrial, and residential applications typically draw power from the power grid during times of peak demand, e.g., daytime, despite the higher costs and power factor problems associated with its generation and use.

SUMMARY OF THE INVENTION

In exemplary embodiments, energy may be stored in one or more battery packs (e.g., stationary batteries or vehicle batteries) for use in buildings, appliances, and equipment typically relying on energy from a power grid. The exemplary embodiments may store the energy during periods of low demand and/or low cost of energy. Thus, the exemplary embodiments may reduce costs associated with energy usage. The exemplary embodiments may use the stored energy to reduce demand on the power utility during periods of high demand and/or provide energy back to the power utility to meet demands.

One embodiment of the invention is an electric vehicle home microgrid power system having a utility microgrid electrical connection configured for net metering home power; a vehicle detachably connected to the utility microgrid electrical connection, the vehicle configured to supply bidirectional electrical power from an onboard vehicle battery; an onboard vehicle charging circuit comprising; an onboard vehicle battery management system; a home current reference generator configured to predict demand charges for the home power; a microcontroller comprising a non-transitory computer-readable storage medium configured with instructions executable by one or more processors to cause the one or more processors to receive input from at least one sensor and transmit conditioned control signals to the onboard vehicle charging circuit; a mode selector; and a host application electronically communicating with onboard vehicle charging circuit telematics.

Another embodiment of the invention is a method of operating an electric vehicle home microgrid power system, comprising the steps of: net-meter coupling an electric vehicle to a home power system through an onboard vehicle charging circuit comprising a vehicle battery and battery management system; transmitting telematics of the vehicle charging circuit to a mode selector via a microcontroller preconfigured with machine-readable instructions to instruct the mode selector to operate by; switching to vehicle-to-home operating mode upon grid failure, if a battery voltage sense circuit determines that the vehicle battery has sufficient power to discharge and power the home; else switching to grid-to-vehicle operating mode when the grid current sense circuit senses grid operation, thereby routing grid power to the home and vehicle in accordance with day ahead forecasting; else switching to vehicle-to-home operating mode when the home is operating in peak demand hours as calculated during the previous day, whereby the vehicle battery is switched to power the home thereby reducing the net metering; else switching to vehicle-to-grid operating mode when net metering determines that grid conditions are suitable to accept vehicle power; else switching to grid-tovehicle operating mode if the vehicle battery state of charge is less than a predetermined threshold, whereby the grid powers the home and charges the vehicle battery; and else switching off the vehicle charging circuit when the vehicle battery state of charge is greater than or equal to a predetermined threshold.

DETAILED DESCRIPTION

Increase in electricity demand has seen a surge in recent years. The transition towards sustainable energy development has led to increase in use of electric vehicles (EVs) in order to reduce the use of fossil fuels. EVs represent 64% of projected sales alone in United States of America by the year 2030. EV batteries are capable of producing reactive power and deliver part of the energy to the house. This forms a microgrid with distributed energy resources capable of supporting the electrical power grid.

The onboard EV charger controller 80, taught herein, enables the modes of vehicle-to-home, vehicle-to-grid, and grid-to-vehicle transmission of electrical power. The system works in an isolated condition without involving any other back up supply, thereby acting as a microgrid. The onboard EV charger controller 80 senses peak energy demand of the house or home in a day, and enables the EV battery 9 to supply vehicle-to-home power during this peak demand, thereby reducing the electrical demand charges for the house. The term 'onboard', as defined herein, means situated or integrated with a vehicle 44.

A self-contained network built into the electric vehicle home powered system, sometimes referred to in this document as power home link, can serve as a power source to any home equipped with proper electrical connections, such as those with net metering capability. The vehicle 44 manages and stores those natural resources as battery power at the point of consumption and is portable, movable, clean and renewable. Electrical energy is provided directly from your vehicle 44 as DC power, then goes through a process that converts DC power into AC that connects to your home either directly or through non-contact inductive system.

The clean energy power home link generating system brings clean power to a home during a power outage, which includes a power home link and other vehicle power generating system with battery and motor for outputting power via connection or induction to an in-house load. Components of the power home link can include at least one battery, a motor and a portable or movable vehicle 44. The power generator can include an electric vehicle 44 for storing the clean power that is being distributed, and further regenerating through the EV motor and other means, and a net energy power meter for detecting power consumption and supplying the in-house load after or during conversion from DC to AC to power a house. An on-board EV charging circuit controls the power generator so as to reduce the output preset power amperage and voltage to the load, as compared with the using only load tracking. Since the electronic control unit controls the battery so as to know when power from the utility is no longer available and automatically starts the and provides the necessary power for the home. The system then also stores excess power, when output power exceeds the power consumption detected by the power meter, generated power can be utilized effectively without waste and further sold back to the utility company through net metering or other means. Further, fixed home solar systems 46 can be used to re-charge the power home link creating a self-contained portable and movable clean and renewable energy system.

Charging the energy storage device in electric or hybrid-electric vehicles can use inductive charging. Inductive charging uses a first induction coil to create an alternating electromagnetic field from within a charging station located externally to the vehicle. This first induction coil is usually located within a "paddle" or other device to form one half of an electrical transformer. A second induction coil is located within the vehicle, and when the "paddle" or other device containing the first induction coil is placed in close proximity to the second induction coil within the vehicle, the two induction coils form an electrical transformer that transfers power via the electromagnetic field and converts it into electrical current to charge the vehicle's energy storage device. Unlike conventional conductive charging, inductive charging involves no exposed conductors, and thus environmental conditions such as rain, snow, and fog do not greatly affect the charging performance. However, the user must still manually place the two induction coils in proximity to one another. Thus, to initiate a charging cycle, the user must exit the vehicle, thereby becoming exposed to the environmental conditions.

A system is disclosed to transmit power from vehicle-to-home in which an electric vehicles' battery interacts with home appliances for uninterrupted power supply to the home. The onboard charger circuit controller 80 allows grid-to-vehicle, vehicle-to-grid and vehicle-to-home operation modes. Upon power outage on the home side, the onboard charger 80 senses the outage and switches to discharging mode from the EV batteries. Also, during peak load demand, the charger controller can discharge from the EV batteries thereby reducing electricity price of the house. The SOC of the battery is monitored by the battery management system which controls the charge and discharge of EV batteries. The bi-directional converter allows both charging an EV and discharging from the EV batteries to power the house. The topology is constructed, and bi-directional converter behavior is analyzed when detecting the power outage, which enables faster transition between operation modes.

Net metering (or net energy metering) configures the EV to feed the utility grid through an electricity billing mechanism that allows consumers who generate some or all of their own electricity to use that electricity anytime, instead of when it is generated. Monthly net metering allows consumers to use electric vehicle power generated at any time, during the day or at night, to avoid utility demand charges. A multi-criteria EV battery charging optimization can be used based on maximal renewable energy, minimal battery and energy costs, and minimal battery degradation.

Figure 1:
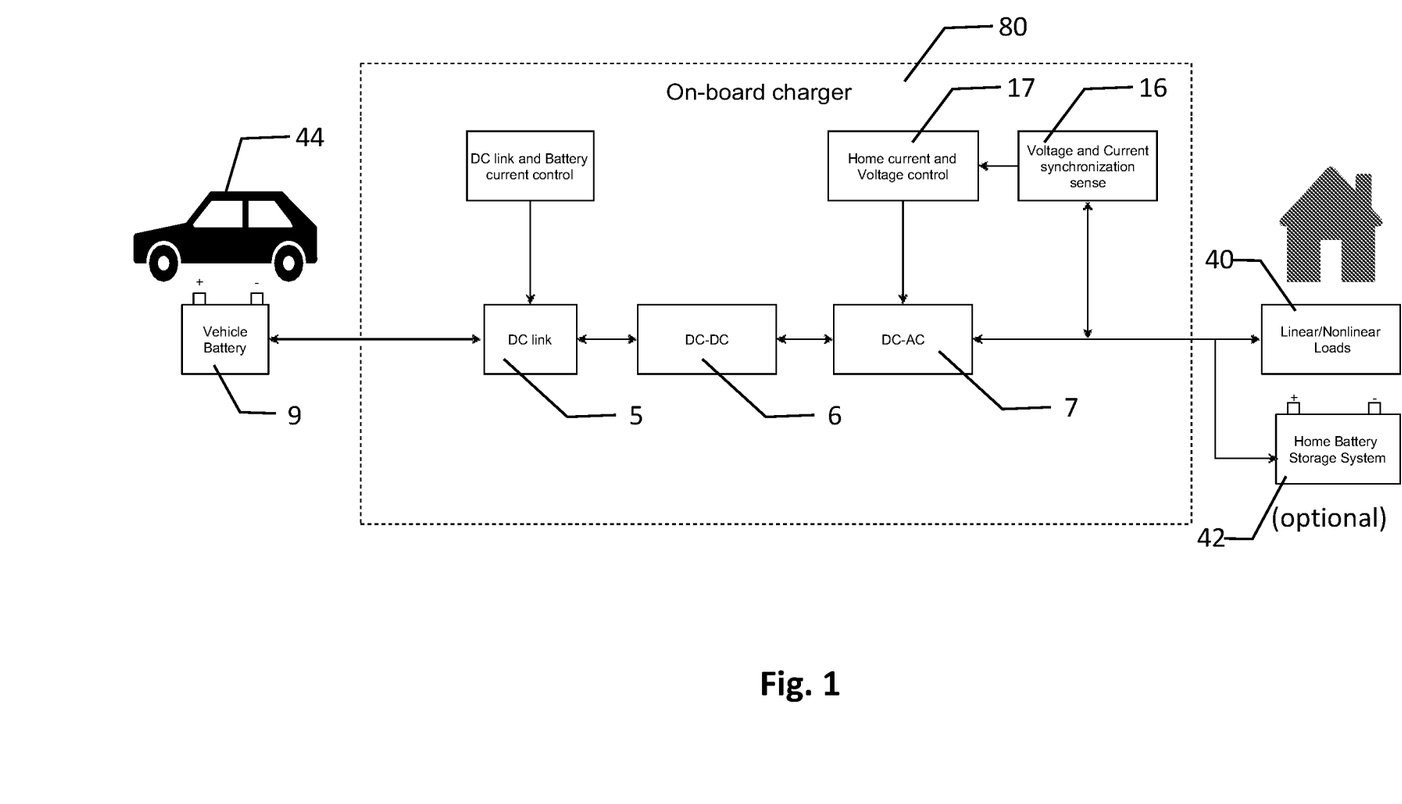
FIG. 1 is a general embodiment schematic of the invention.

FIG. 1 shows a general embodiment schematic of the invention with an onboard charger 80 and optional home battery storage system 42.

Figure 2:
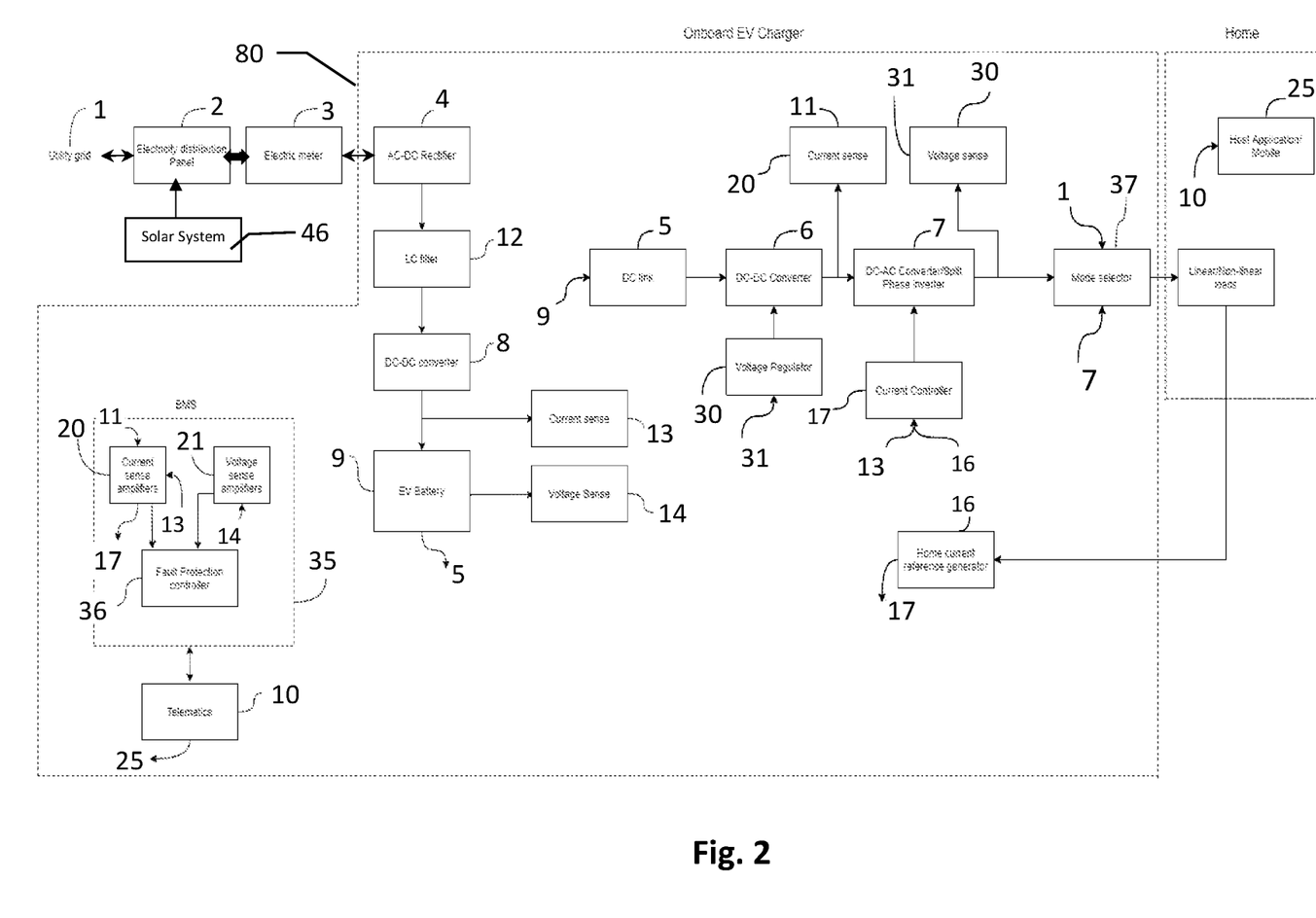
FIG. 2 is a block diagram of the major components of an embodiment.

FIG. 2 shows the onboard EV charger 80, where electricity from the home grid 1 can be converted to DC signal by the use of this built in onboard charger 80, which can be located inside the EV. A home solar system 46 is shown interconnected with the electrical distribution panel 2, and the net-metering electric meter 3. Bi-directional power connections are shown to enable net-metering.

In FIG. 2, the vehicle battery 9 is controlled by the Battery Management System (BMS) 35 with a current 20 and voltage 21 sense amplifier that will provide fault protection 36 for the battery, also monitoring each cell of a battery pack will enhance the battery pack health. BMS 35 associated with EV battery pack 9 will provide main features to the user like State of Charge (SOC), State of Health (SOH), Safe Operating Area (SOA), and much more. Telematics 10 which is connected with the BMS 35 will send the Battery Management System information to the user or the host application 25 hence the user can know the complete battery pack 9 condition with additional fault indications to the customer. If the current from the grid is more than the specified threshold value (either current or voltage) the BMS 35 will adjust the high or low current and/or voltage conditions and bring the values within the SOA. The system provides continuous power supply to the user with less interruption between the Battery 9 and the home supply mains. The utility grid 1 connects to the home supply mains via an electricity distribution panel 2 by dividing the main electricity for the subsidiary circuits and also provides fault protection like overcurrent, overvoltage, etc. for the users. Also, electric meter 3, with net metering capability, will record the amount of electricity utilized by the end-user. When the user selects to power the house only by the utility grid, then the EV will be in charging mode. Once the EV goes into charging mode, an onboard EV charger 80 will start to operate. During this case, the electricity from the utility grid 1 is directly or inductively connected to a suitable home EV plug for the current ratings of the battery 9. The utility power is converted to a DC form with the help of an AC-DC converter 4. The DC signal from the AC-DC converter 4 will have high-frequency harmonics due to the presence of power electronics circuits i.e. at the AC-DC converter 4 part and can influence the system to operate in an undesired manner and also leads to internal system failure. These high-frequency harmonics must be mitigated before giving to the main EV battery 9 by using the LC (inductor capacitor) filter 12. Basically, the LC filter 12 will allow only the frequencies which are within the specified limits to pass. The filtered DC signal will have some voltage difference and can be level to suitable DC voltage value by using the DC-DC converter 8. The output of the DC-DC converter 8 will provide suitable voltage and current for the EV battery pack 9 for charging. While charging, the current entering the battery 9 and the voltage across the DC-DC converter 8 can be measured by using the current sensor 13 and voltage sensor 14 associated with amplifiers. Then current amplifier 20 and voltage amplifier 21 amplifies the sensed signal to a suitable signal for the fault protection controller 36 of the BMS 35. If the system detects any kind of fault during charging, the BMS 35 will operate to bring the system conditions to operate under SOA without any external influence, for example by the consumer. Once the battery is fully charged, the BMS 35 will disconnect the main supply of the utility grid 1 from the EV Battery pack 9 and indicates user as the vehicle is fully charged. Then, the fully charged battery 9 can be utilized for powering the home during peak hours.

This system will have the advantage of removing the separate home uninterruptable power system (UPS), such as an optional battery 42 to use during a grid outage. The EV batteries can be made of highly advanced lithium ion technology to provide more reliable sustained power usage for the customer than other conventional battery types such as lead-acid. Hence, the user can experience a long-lasting electricity supply without any interruption. The EV battery pack energy 9 can also successfully serve many more non-linear loads 40 than conventional home batteries.

When the user EV is fully charged, during peak power demand hours EV will provide the electricity for the home by discharging the EV battery pack 9, thereby avoiding utility demand charges. During battery discharging, i.e. during powering the house from the EV mode, the mode selector 37 will select the EV system to give battery 9 energy to the home. During this process, the DC signal from the EV battery pack 9 will be converted to suitable AC by using the DC-AC converter 7 with a DC link 5 and a DC-DC converter 6. The DC-link 5 at the DC-DC converter 6 part will provide a suitable voltage level and hence the DC-DC converter can also be controlled with DC-link 5 to get suitable DC voltage and current at the output side of the DC-DC converter 6. The DC-DC converter 6 output is directly connected to the DC-AC split phase inverter 7 where it will convert the DC signal to split phase or single-phase AC signal. The converted DC-AC signal will be controlled by the current controller 17 by feeding the home current reference signal 16 which will create a current error at the current controller side. So the current error can be used to control the current which is flowing into the home loads hence it will bring the system to work in flexible condition i.e. user can vary the loads at any point of time and the onboard EV charger 80 will ensure the system to operate in a safe condition. The current which is flowing out from the EV battery pack 9 and the voltage across the EV battery pack will be sensed by using the current sensor 13 and voltage sensor 14. Sensed current and voltage are given to the current and voltage sense amplifier 20, 21 to enhance the signal level to a suitable value for the fault protection controller 36 of a BMS 35. Once the vehicle experience low Battery SOC, telematics 10 will inform the user by sending a message indicating that the system is facing under/low SOC. So, the customer will get to know earlier and can charge the vehicle for conventional purposes. Also, the user will change the mode selector 37 to powering the house by grid mode. Hence in peak hours and off-peak hours or for any conditions, the system provides a continuous supply to the home.

Referring to FIG. 2, the mode selector 37 controls the charging and discharging of the battery 9 based on the threshold level as well as the availability of power from the utility grid 1. If there is a failure of power from the grid, and the SOC of the electric vehicle battery 9 is greater than a preselected threshold value, then the mode selector 37 automatically switches to discharge mode for the battery to power up the house. Otherwise, if there is an availability of power from the utility grid and the electric vehicle battery 9 is less than the preselected threshold value, the mode selector 37 automatically switches to charge mode to charge the battery.

Figure 3:
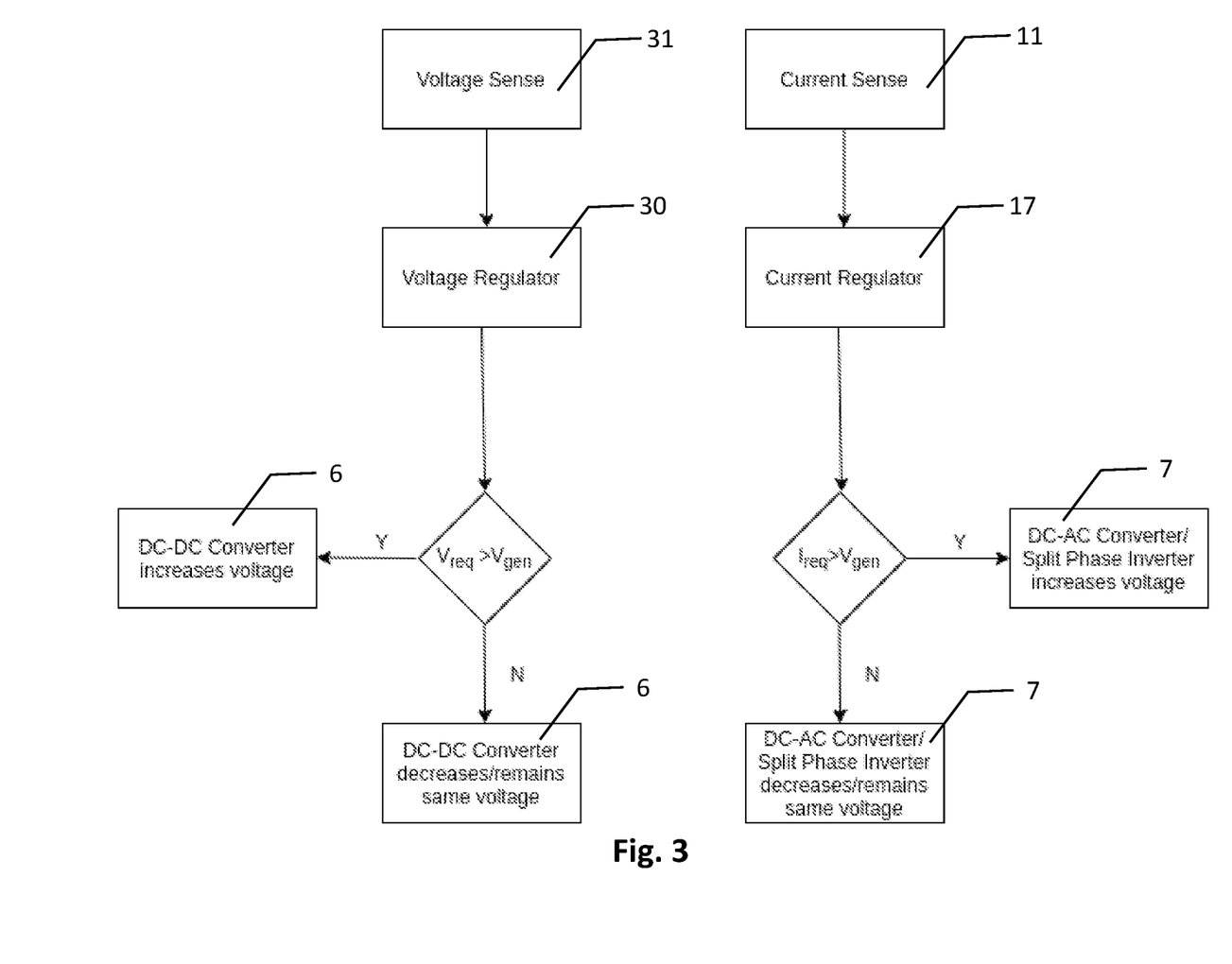
FIG. 3 is a flow diagram of a portion of the voltage and current control logic.

Again, referring to FIG. 2, the home current reference generator 16 stores peak power usage of the household during a day and uses day-ahead-forecasting to determine if the electric vehicle battery 9 can be used to power the household during high peak hours thereby reducing the load on the utility grid. Referring to FIG. 3 the algorithm is described for controlling the power when the electric vehicle is discharging to power the household. The first step is to measure the power required by the household appliances which is achieved through the current sense 11 and voltage sense 31. These values are necessary to control the DC-AC Converter/Split Phase Inverter 7 and the DC-DC Converter 6 by current controller 17 and voltage regulator 30 respectively.

As indicated in FIG. 2 the readings that the voltage regulator 30 senses from the voltage sense 11 are compared to the current reading of the voltage that is required from the Electric Vehicle Battery 9. As indicated, if the required voltage is more than the existing voltage provided by the DC-AC Converter/Split Phase Inverter 7 then the voltage is up regulated to meet the required power requirements. The current controller 17 controls the DC-AC Converter/Split Phase Inverter 7 to control the amount of current required. If more current is required, the inverter IGBT gates are regulated for more current.

On the Electric Vehicle Battery 9 side, as can be seen in FIG. 3 the Battery Management System (BMS) constantly monitors the Electric Vehicle Battery for the amount of voltage left on individual group of cells so as to warn the user through a telematics 10 system about the amount of time the battery can discharge and power the household. The sensors on the Battery Management System (BMS) stores various feedback signals from the EV Battery 9, including temperature, Pack Voltage, Pack Current, individual cell voltages and pack state-of-charge.

Figure 4:
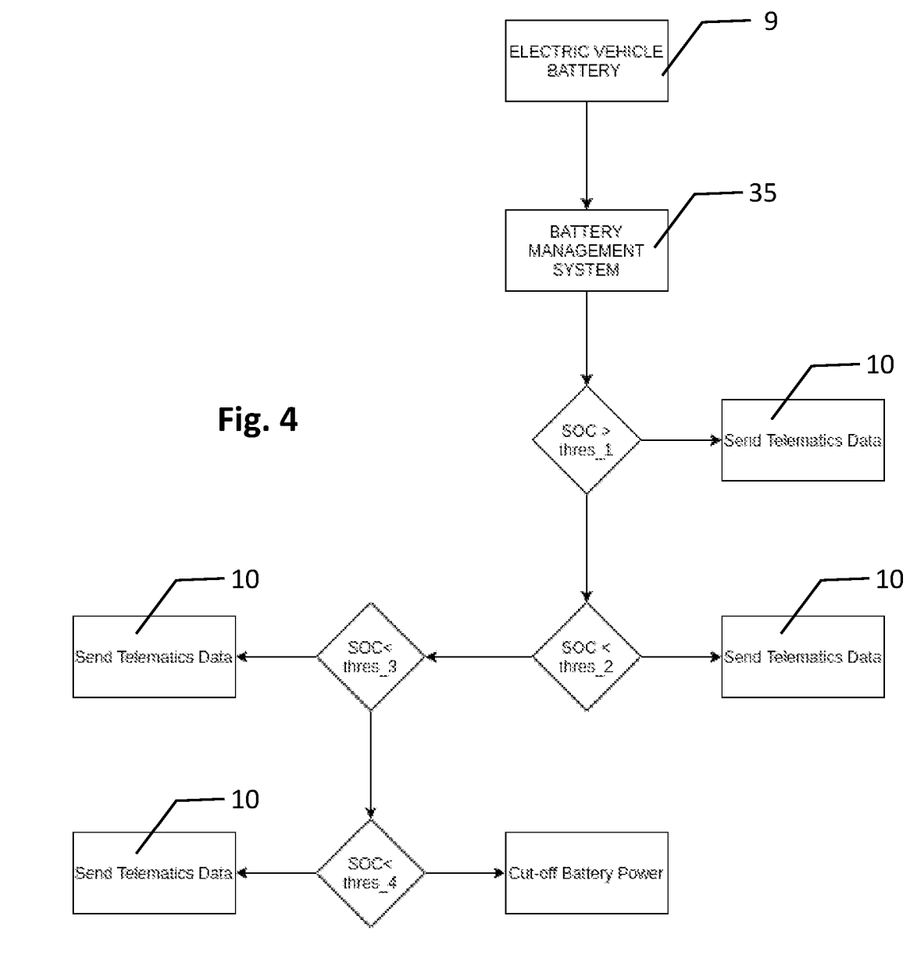
FIG. 4 is a flow diagram of a portion of the battery management system.

Referring to FIG. 4, an algorithm is provided to control the EV battery 9 output as well as send the EV battery 9 information to the user. The telematics device 10 communicates over the internet with the user as well as displays the aforementioned information to the user. The BMS incorporates state-of-charge of the battery 9 as well as the threshold values at which the information about the battery 9 is transmitted to the user. If it is determined that the battery 9 SOC is less than threshold_1 then the information is sent to the user and the subsequent assertion is made when the SOC reaches threshold_2. If it is determined that the battery 9 SOC is less than threshold_1 then the information is sent to the user and the subsequent assertion is made when the SOC reaches threshold_3. If it is determined that the battery 9 SOC is less than threshold_1 then the information is sent to the user and the subsequent assertion is made when the SOC reaches threshold_4. Threshold_4 is the stage where the battery 9 is at its least voltage i.e. it has drained completely and at the very moment the connection of the battery is terminated to the household.

Figure 5:
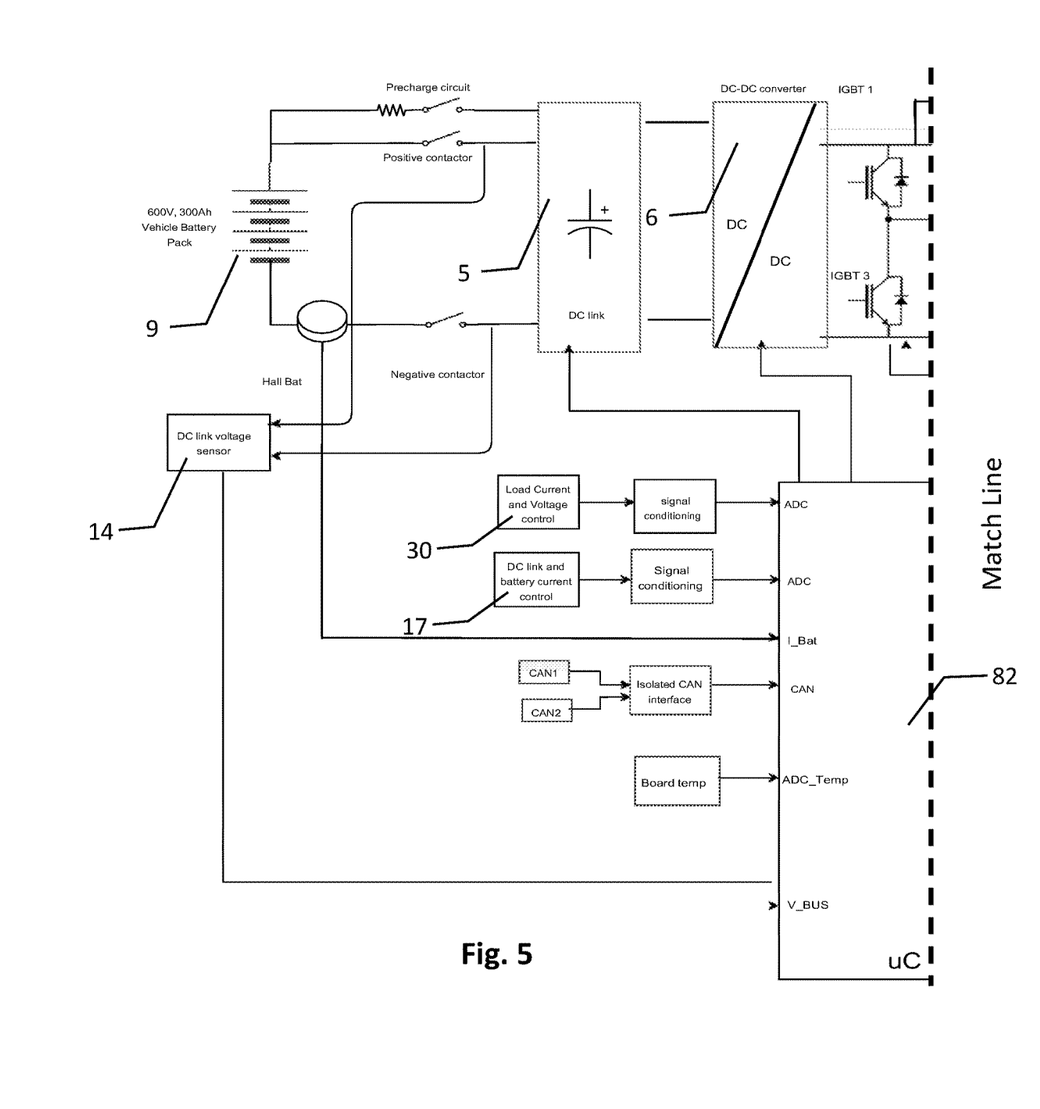
FIG. 5 is a partial section of a schematic diagram cut at the match line in FIG. 6.
Figure 6:
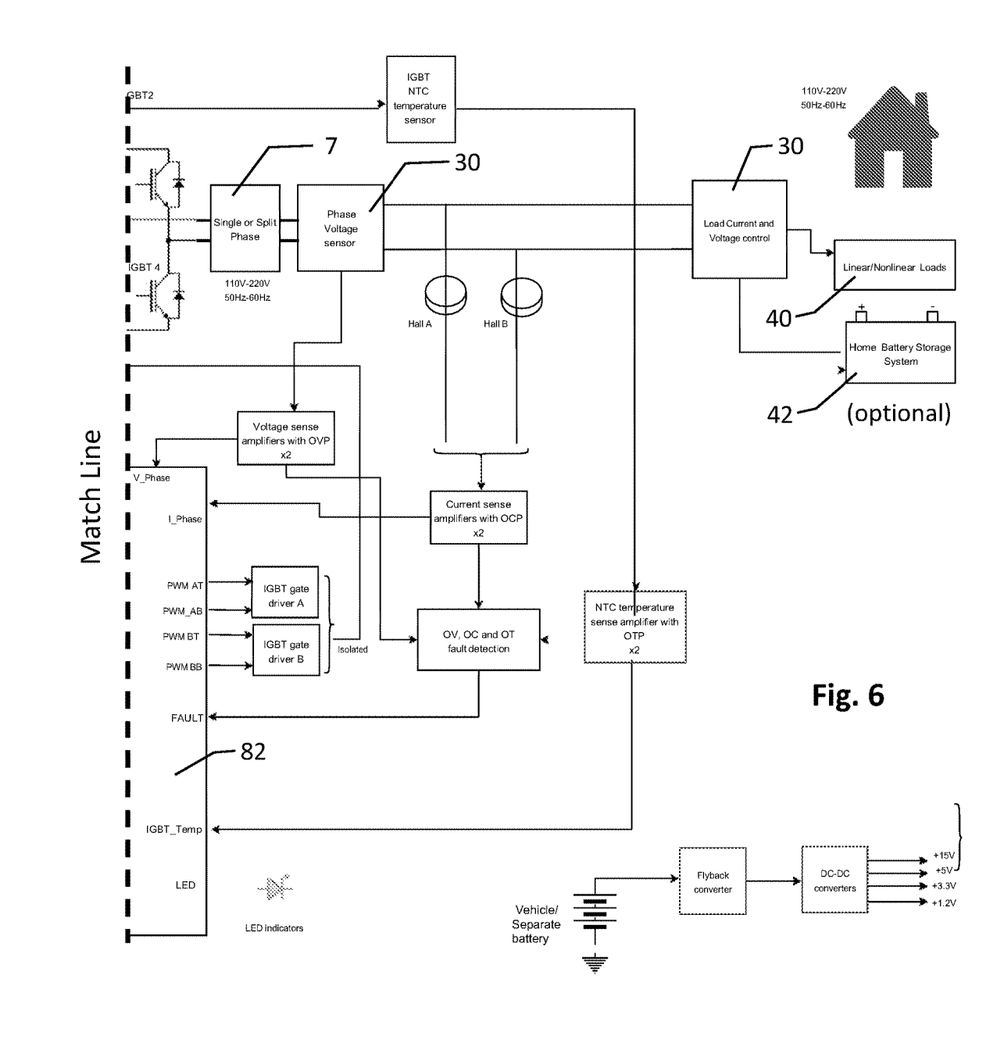
FIG. 6 is a partial section of a schematic diagram cut at the match line in FIG. 5.
Figure 7:
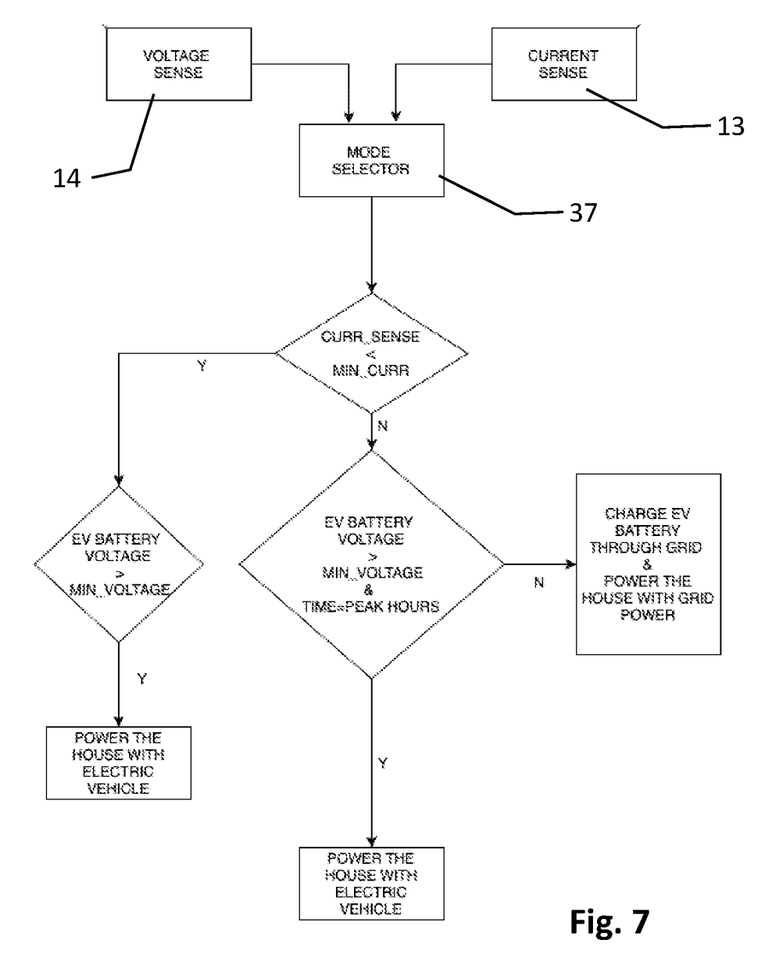
FIG. 7 is a logic flow diagram of the mode selector portion of an embodiment.

FIGS. 5 & 6 are a more detailed schematic of an embodiment of the invention showing the optional home battery 42 storage, inverters 7, some sensors, and a microcontroller (uC) 82 portion of the charge controller 80 that collects and processes data from the sensors in accordance with the disclosed logic and algorithms. The microcontroller 82 can be a non-transitory computer-readable storage medium configured with instructions executable by one or more processors to cause the one or more processors to receive input from at least one sensor and transmit conditioned control signals to the onboard vehicle charging circuit. The microcontroller 82 also receives telematics from various sensors of the vehicle charging circuit 80 and conditions a control signal to the mode selector 37 via a microcontroller preconfigured with machine-readable instructions to instruct the mode selector 37 to operate by;

FIG. 7 describes the function of mode selector 37 unit which intelligently controls the power distribution amongst grid, EV and the house. This feature provides a hands-free experience to the whole system wherein the user does not have to worry about controlling the system. The first task the mode selector 37 does is to sense the current 13 from the grid. If the grid has a failure, then the algorithm takes the value from the battery management system via the voltage sense circuit 14 to determine if the battery has sufficient power to discharge and power the household, else if it senses current on the grid lines it decides to route power to the house in accordance with the day ahead forecasting. If the house is operating under peak hours as calculated during the previous day, and the electric vehicle battery is charged to power the house then to reduce the net metering, it switches the EV Battery to power the house, else if the battery is not charged to a certain level then the grid powers the house and charges the battery.

The invention has been described with reference to the preferred embodiments without limit thereto. One of skill in the art would realize additional embodiments and improvements which are not specifically stated but which are within the meets and bounds of the claims appended hereto.

The invention claimed is:
1. An electric vehicle home microgrid power system comprising:
    a utility microgrid electrical connection configured for net metering home power;
    a vehicle detachably connected to the utility microgrid electrical connection, the vehicle configured to supply bidirectional electrical power from an onboard vehicle battery;
    an onboard vehicle charging circuit comprising;
        an onboard vehicle battery management system;
        a home current reference generator configured to predict demand charges for the home power;
        a microcontroller comprising a non-transitory computer-readable storage medium configured with instructions executable by one or more processors to cause the one or more processors to receive input from at least one sensor and transmit conditioned control signals to the onboard vehicle charging circuit;
        a mode selector; and
    a host application electronically communicating with the onboard vehicle charging circuit using telematics.

2. The power system of claim 1, wherein the mode selector comprises a switching device to switch between grid-to-vehicle, vehicle-to-grid and vehicle-to-home operation modes.

3. The power system of claim 2, wherein the onboard vehicle charging circuit optimizes EV battery charging using multi-criteria based on maximal renewable energy, minimal battery and energy costs, and minimal battery degradation.

4. The power system of claim 1, wherein the utility microgrid electrical connection comprises a non-contact inductive connector.

5. The power system of claim 1, wherein the utility microgrid electrical connection comprises a home solar system connector.

6. The power system of claim 1, wherein the onboard vehicle charging circuit comprises at least one bidirectional split phase DC-AC converter.

7. The power system of claim 1, wherein the onboard vehicle charging circuit comprises at least one inductor capacitor (LC) filter.

8. The power system of claim 1, wherein the battery management system transmits telematics for a state of charge, state of health, and safe operating area for the onboard vehicle battery.

9. The power system of claim 8, wherein the onboard EV charger circuit comprises a current controller to automatically maintain the output of the charger circuit within the safe operating area.

10. The power system of claim 9, wherein the battery management system comprises a fault protection controller.

11. The power system of claim 1, further comprising a home battery storage system.

12. The power system of claim 1, wherein the home current reference generator predicts home power demand using day ahead forecasting for mode selector operation.

13. The power system of claim 1, wherein the battery management system determines at least one of EV battery temperature, EV battery pack voltage, EV battery pack current, EV battery pack individual cell voltages, and EV battery pack state of charge.

14. A method of operating an electric vehicle home microgrid power system, comprising the steps of:
- net-meter coupling an electric vehicle to a home power system through an onboard vehicle charging circuit comprising a vehicle battery and battery management system;
- transmitting telematics of the vehicle charging circuit to a mode selector via a microcontroller preconfigured with machine-readable instructions to instruct the mode selector to operate by;
  - switching to vehicle-to-home operating mode upon grid failure, if a battery voltage sense circuit determines that the vehicle battery has sufficient power to discharge and power the home; else
  - switching to grid-to-vehicle operating mode when the grid current sense circuit senses grid operation, thereby routing grid power to the home and vehicle in accordance with day ahead forecasting; else
  - switching to vehicle-to-home operating mode when the home is operating in peak demand hours as calculated during the previous day, whereby the vehicle battery is switched to power the home thereby reducing the net metering; else
  - switching to vehicle-to-grid operating mode when net metering determines that grid conditions are suitable to accept vehicle power; else
  - switching to grid-to-vehicle operating mode if the vehicle battery state of charge is less than a predetermined threshold, whereby the grid powers the home and charges the vehicle battery; and else
  - switching off the vehicle charging circuit when the vehicle battery state of charge is greater than or equal to a predetermined threshold.

15. The method of claim 14, wherein the net-meter coupling further comprises connecting either directly or through a non-contact inductive system.

16. The method of claim 14, wherein the battery management system telematics comprises a state of charge, state of health, and safe operating area for the onboard vehicle battery.

17. The method of claim 16, wherein the state of charge telematics comprises a plurality of threshold values.

18. The method of claim 14, further comprising electronically communicating the telematics to a host application.

19. The method of claim 14, wherein the vehicle to home operating mode further comprises transmitting power to a home battery storage system.

20. The method of claim 14, wherein the net meter coupling further comprises electrically coupling to a home solar system.

\* \* \* \* \*